United States Patent [19]

Bakalar

[11] Patent Number: 5,753,310
[45] Date of Patent: May 19, 1998

[54] PROTECTIVE COATING FOR VEHICLES

[76] Inventor: Marvin Bakalar, 3111 University Dr., Suite #605, Coral Springs, Fla. 33065-5060

[21] Appl. No.: 841,149

[22] Filed: Apr. 29, 1997

[51] Int. Cl.⁶ .................... B05D 1/02; C09K 3/18
[52] U.S. Cl. .................... 427/421; 106/2; 106/244
[58] Field of Search ............ 106/2, 244; 426/609; 427/421

[56] References Cited

U.S. PATENT DOCUMENTS

| 4,155,770 | 5/1979 | Doumani | 426/609 |
| 4,163,676 | 8/1979 | Konigsbacher | 426/609 |
| 5,046,449 | 9/1991 | Nelson | 134/123 |
| 5,063,084 | 11/1991 | Nelson | 427/154 |
| 5,088,649 | 2/1992 | Hanson et al. | 239/329 |
| 5,650,185 | 7/1997 | Stoltz | 426/115 |
| 5,667,138 | 9/1997 | Crampton | 239/225.1 |

*Primary Examiner*—Anthony Green
*Attorney, Agent, or Firm*—James A. Quinton, Esq.

[57] ABSTRACT

A method of protecting a vehicle from insects, leaf stains and the like is provided. A vegetable oil, lecithin composition is applied to the vehicle to provide a protective coating.

12 Claims, No Drawings

PROTECTIVE COATING FOR VEHICLES

BACKGROUND OF THE INVENTION

1. Technical Field

The field of the invention is protective coating for application to a vehicle particularly automobiles, buses and trucks.

2. Background Art

Painted surfaces of vehicles are subject to damage from airborne hazards. Particularly harmful are flying insects that can be encountered in abundance in warm moist areas. Splattered bugs are difficult to remove and can damage paint due to the corrosive nature of their blood. In colder regions, salt and other deicing chemicals can splatter onto the painted surfaces of vehicles. Both the splattered bugs and the salt can have a deleterious effect on the painted finish of the cars.

Application of vegetable oils to automobiles has been suggested. However, it has been considered unsuitable for use on windshields. Moreover, it must be reapplied after each washing. See U.S. Pat. No. 5,063,084 (Nelson). Complex vegetable oil containing compositions have also been suggested as protective coatings for example U.S. Pat. No. 5,063,084 (Nelson).

Lecithin mixed with vegetable oil is in use in the cooking field as a pan coating for easy clean up after cooking, see U.S. Pat. No. 5,088,649 (Hanson). Examples of vegetable oil, lecithin pan coatings that are commercially available are PAM® and VEGALEN® cooking oils.

SUMMARY OF THE INVENTION

The present invention is directed to an improved protective coating for vehicles such as cars, trucks, buses, boats and planes. According to the invention a lecithin containing composition is applied to the painted exterior of the vehicle. Optionally, the composition can be applied to the windshield of the vehicle. The resulting vehicle is resistant to the adherence of insects, and can be easily cleaned of any insects that do adhere to the vehicle. When the protective coating according to the invention has been applied, the vehicle can be easily cleaned of tree sap, leaf stains, bird droppings, insect remains and the like.

The preferred embodiment of the present invention is illustrated in the examples. However, it should be expressly understood that the present invention should not be limited solely to the illustrative embodiment.

DETAILED DESCRIPTION OF THE INVENTION

The present invention is directed to an improved protective coating for vehicle's. According to the invention a lecithin containing composition is applied to the surface of the vehicle for which protection is sought. Generally the front painted surface is treated. Optionally the windshield area may be treated to provide a surface which would be less susceptible to the sticking of insects and other organic particles that are likely to be encountered during the vehicle's use. Optionally, the sides of the vehicle or the entire vehicle can be treated.

Desirably the lecithin containing composition is a lecithin vegetable oil mixture. Preferably the composition according to the invention is provided as a sprayable composition desirably an aerosol composition. Desirably the composition contains from 0.1% to 15% lecithin and 99.9% to 85% vegetable oil. Preferably an acceptable aerosol propellant is used to propel the composition according to the invention. Optionally a diluent such as ethanol can be added to the lecithin, vegetable oil composition to decrease its viscosity.

Preferably a 1% to 15% percent lecithin and 99 to 85% vegetable oil composition is used. Most desirably a composition having about 5% to 8% lecithin is used.

In use a vehicle preferably an automobile is treated with the vegetable oil, lecithin composition. Desirably the area to be treated is first washed. Preferably an aerosol composition is used. Alternatively a handpump sprayer can be used. Optionally the composition can be applied from a container with a cloth. According to the invention, the section of the vehicle to be treated, is sprayed with the lecithin, vegetable oil composition. Any excess is desirably wiped off for example by a plain paper towel, cloth or sponge. As a result a protective coating is formed on the vehicle. Optionally the windshield can be treated. The product is sprayed on the windshield and then wiped off. In the event that there is any streaking or deleterious visibility effects, a window cleaner such as Windex® can be used to remove any clouding of the windshield. As a result, a protective coating is formed on the vehicle both on the pained surface and the windshield which prevents sticking of organic debris encountered during the vehicle's use. Insect remains, tree sap and leaf stain can be easily removed by normal washing. Moreover, the number of splattered bugs adhering to a vehicle is reduced. During a trip through infested areas, the insect remains can be substantially cleaned from the windshield by use of the windshield washers. Salt and other deicing compositions can also be more easily removed.

The composition once applied is resistant to rain and washing and will withstand several car washes and rain storms while still providing its prophylactic effect to the surface of the vehicle.

In another aspect of the invention, a kit for providing a protective coating to a vehicle is provided. The kit includes an aerosol container of the lecithin, vegetable oil containing composition, a sponge for spreading the composition on the car and removing any excess, a bottle of window cleaner and a roll of paper towels. The car is sprayed with the lecithin, vegetable oil composition. The composition is spread evenly on the car with the sponge which also removes any excess and allowed to dry. The windshield is sprayed and any excess is removed with the sponge. The windshield is then sprayed with a window cleaner and dried with paper towels to maximize visibility through the windshield. The sponge can be cleaned in a bucket of soapy water for reuse.

EXAMPLE

A late model automobile was treated according to the invention. One side of the automobile was treated with an aerosol composition containing approximately 6% to 7% lecithin and 93% to 94% vegetable oil packaged in an aerosol container according to the invention. The other side of the vehicle was treated with vegetable oil. The car was driven through bug infested areas over a three day period. The car was then washed. The side treated with the lecithin containing spray was easily cleaned from bugs while the side that was treated with the vegetable oil still contained bug residues despite washing.

The foregoing is considered as illustrative only to the principles of the invention. Further, since numerous changes and modifications will occur to those skilled in the art, it is not desired to limit the invention to the exact construction and operations shown and described above, and accordingly all suitable modifications and equivalents may be resorted to, falling with the scope of the invention.

I claim:

1. A method of providing a protective coating for a vehicle comprising applying a film forming amount of a lecithin and vegetable oil containing composition to the vehicle.

2. A method of providing a protective coating for a vehicle comprising spraying on a portion of said vehicle a composition containing 0.1% to 15% lecithin and 99.9% to 85% vegetable oil.

3. A method according to claim 2 wherein said composition is from 1% to 15% lecithin and 99% to 85% vegetable oil.

4. The method according to claim 2 wherein said composition is sprayed from an aerosol container.

5. The method according to claim 2 further comprising removing any excess composition from said vehicle.

6. The method according to claim 4 wherein a viscosity reducing diluent is added to said composition prior to spraying.

7. The method according to claim 6 wherein the diluent is ethanol.

8. The method according to claim 2 wherein said composition is applied to a front painted surface of the vehicle.

9. The method according to claim 2 wherein said composition is applied to a windshield of the vehicle.

10. The method according to claim 2 wherein said vehicle is a truck, bus or automobile.

11. The method according to claim 2 wherein said vehicle is an automobile.

12. The method according to claim 2 wherein the composition contains about 5% to about 8% lecithin.

* * * * *